Jan. 9, 1940.  H. L. STILES  2,186,845
COOKER
Filed May 20, 1937
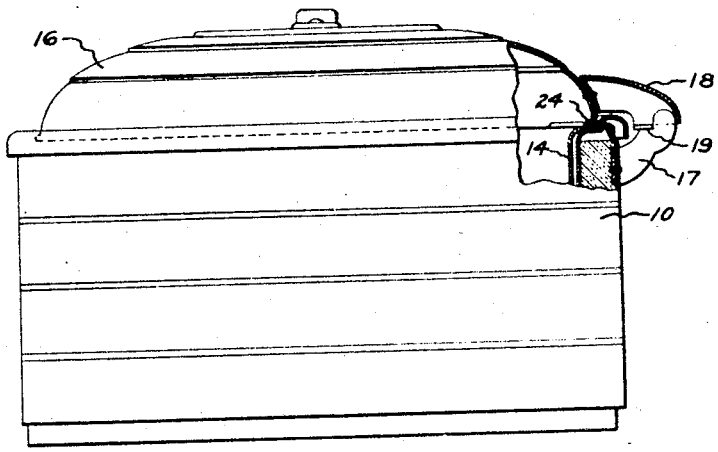
Fig. 1.
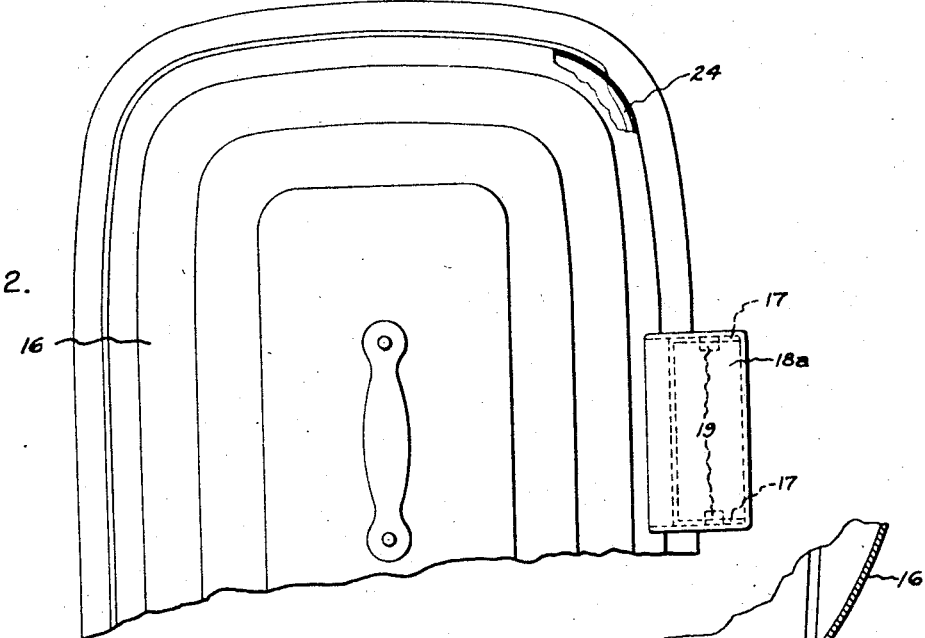
Fig. 2.
Fig. 3.
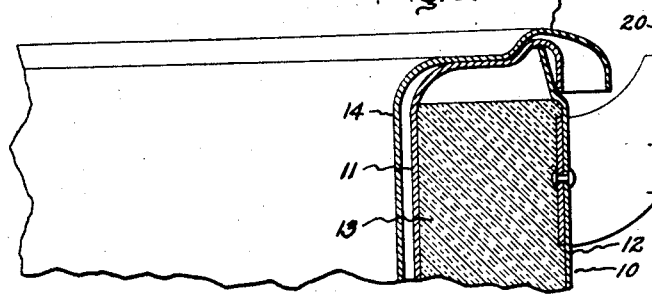
Inventor:
Harry L. Stiles,
by Harry E. Dunham
His Attorney.

Patented Jan. 9, 1940

2,186,845

UNITED STATES PATENT OFFICE 2,186,845

COOKER

Harry L. Stiles, Bridgeport, Conn., assignor to General Electric Company, a corporation of New York Application May 20, 1937, Serial No. 143,765

4 Claims. (Cl. 53—8)

This invention relates to cookers, more particularly to electrically heated portable roasters, and it has for its object the provision of an improved device of this character.

More specifically, this invention relates to electric portable roasters having an electrically heated portable receptacle for receiving meats, vegetables and other edibles it is desired to roast or bake, and a lid which covers the receptacle while the edibles are being cooked.

In devices of this character heretofore known, some difficulty has been experienced due to steam condensing and collecting on the inner surface of the lid, and also to grease spattering on it and collecting with the moisture of the condensed steam. As long as the lid is closed, this is not objectionable, but when the lid is opened the moisture and grease drip down onto the table, stove or other support upon which the roaster is placed.

This invention contemplates an improved roaster which obviates this difficulty; and in one form thereof my improved roaster is provided with a lid or cover having on its edge that is lowermost when the lid is opened an inwardly extending lip or flange which functions as a well to collect and retain any moisture or other liquid that drains down from the lid. Should the lid be closed again before the roaster is cleansed, the collected liquids will run from the well down into the roaster receptacle.

For a more complete understanding of this invention, reference should be had to the accompanying drawing in which Fig. 1 is an end elevation of an electric roaster embodying this invention, parts being shown in section so as to illustrate certain details of construction; Fig. 2 is a fragmentary plan view of the electric roaster of Fig. 1 with parts shown in section so as to illustrate certain structural details; and Fig. 3 is an enlarged fragmentary sectional view of a part of the electric roaster of Figs. 1 and 2.

Referring to the drawing, this invention has been shown in one form as applied to an electrically heated roaster comprising a receptacle 10 constituting a heating chamber. It will be understood that suitable electrical heating elements (not shown) will be mounted in the heating chamber, preferably adjacent the bottom thereof. The receptacle 10 is provided with inner and outer walls 11 and 12 spaced apart, as shown, and arranged to receive between them a suitable heat insulating material 13, such as rock wool. Inserted within the receptacle 10 is a large relatively deep dish 14 which receives the edible to be cooked. This dish at its upper end is provided with a flange 15 flaring outwardly over the upper edge of the receptacle whereby it may be conveniently inserted in and withdrawn from the receptacle. As shown, more clearly in Fig. 2, the receptacle 10 and dish 14 have in general the shape of a rectangle with slightly curved sides and ends joined by rounded corners. It will be understood, however, that these members may have any other suitable shape.

The receptacle 10 is provided with a lid or cover 16. The lid 16 preferably will be formed of a suitable sheet metal, such as steel, and it may be formed into a desired and suitable shape, such as that shown in the drawing, by means of a suitable stamping machine, but its sides and ends should be curved as are those of the vessel 10. It is also preferable to give the lid a dome shape, as shown. The lid is hinged on its rear edge to swing from a horizontal closed position shown in Fig. 1 to a substantially vertical position shown in Fig. 3. For this purpose, a pair of hinge brackets 17 are rigidly secured in spaced relation to the midsection of the rear wall of the cooker; and the lid is provided with a cooperating pair of hinge arms 18 joined together by a hinge cover 18a. The hinge arms have inturned portions 19 which when the lid is closed rest upon seats 20 provided for them on the hinge brackets and when open rest against seats 21 also provided on the hinge brackets. The lid when moved between its opened and closed positions pivots on an axis passing substantially through the point of intersection of the seats 20 and 21 designated by the numeral 22. When the lid is opened, the outer edge 23 of the hinge cover 18a engages the brackets, as shown in Fig. 3, to support the lid in its open position. It will be observed that the hinge is arranged so that the lid may be readily removed from the vessel 10 and reapplied to it. It will also be observed that the hinge means provides for wide swinging movements of the lid away from the receptacle 10 so that when the lid is open, it is positioned back of the rear wall of the receptacle 10. This is important because it completely removes the lid from the open top of the receptacle which is left clear so that edibles can conveniently be placed in and removed from the cooker.

As pointed out previously, this invention contemplates the provision of an improved cooker wherein the lid is so arranged that when it is open the moisture resulting from steam condensing on its inner surface, and other liquids, such as grease, meat juices and the like spattering on it and collecting thereon in the cooking operations will not drain down from the lid and fall onto the table or other support upon which the roaster is placed.

For this purpose, the lid is provided at its rear edge with an inwardly extending lip or flange 24 extending across this edge between the ends of the lid and merging at the ends into the curved corners thereof, as clearly shown in Figs. 1 and 2. It will be observed in view of this construction that when the lid is opened to its elevated position shown in Fig. 3, the flange or lip 24 cooperates with the cover to form a well 25 closed at the bottom, sides and ends but open at the top and positioned to receive and retain the steam condensate and other liquids that will drain down from the lid. The liquids caught in the well 25 will be retained therein until the lid is reclosed when they will drain from the lip down into the vessel 14, or until the lid is removed for the purpose of cleansing it.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States, is:

1. A roaster comprising a cooking receptacle, a lid for said receptacle, hinge means connecting one edge of the lid to the receptacle for swinging movement from a closed position to an upright open position, and an inwardly extending flange on said lid forming with the lid a well positioned along said edge so that when the lid is in its open position the well receives and collects drainage from the inner surface of the lid.

2. An electric roaster comprising an electrically heated cooking receptacle, a lid for said receptacle, hinge means connecting the rear edge of said lid to said receptacle and providing for wide swinging movement of the lid from its closed to a substantially vertical open position wherein the lid is displaced to the rear of the back wall of said receptacle, and an inwardly extending lip on said rear edge of said lid co-operating with the lid only when the latter is open to define a well closed at the bottom and all sides but open at the top to permit condensate and liquids that have collected on the inner surface of the lid during the cooking operation to run into said well where they are retained.

3. An electric roaster and the like comprising a cooking receptacle, a lid for said receptacle, the cooking receptacle and lid being relatively elongated from side to side and the lid being hinged to the receptacle to swing at its rear edge between a substantially horizontal closed position and a substantially vertical open position, and an inwardly extending flange only on said rear edge of said lid defining with the side walls and rear wall of said lid a channel which is arranged when the lid is in its open substantially vertical position to collect liquids and condensate draining downwardly on the inner surface of the lid, the remainder of the side walls and front wall of the lid being free to drain directly downwardly into the cooking receptacle when the lid is closed.

4. An electric roaster and the like comprising a cooking receptacle having a dome-shaped lid, means for hinging the lid to the rear of the receptacle so that the lid may be swung from a substantially horizontal closed position to a substantially vertical open position, and an inwardly extending flange on the lower rear edge of the dome-shaped lid cooperating with the dome of the lid when the lid is open to define a well that is closed at the front, sides and rear and arranged to collect any liquids that drain downwardly on the inner surface of the lid when it is in its open position.

HARRY L. STILES.